United States Patent [19]

Kinner

[11] Patent Number: 4,938,695

[45] Date of Patent: Jul. 3, 1990

[54] WORLD GLOBE ROTATION CONTROL DEVICE

[76] Inventor: Janet L. Kinner, 7772 Elden Ave., Whittier, Calif. 90602

[21] Appl. No.: 254,221

[22] Filed: Oct. 6, 1988

[51] Int. Cl.$^5$ .............................................. G09B 27/08
[52] U.S. Cl. ..................................... 434/131; 368/23; 434/136; 434/142
[58] Field of Search ................................. 434/131–149, 434/287, 288, 291; 368/23, 24; 74/531, 577 SF; 188/82.7, 82.74, 82.77

[56] References Cited

U.S. PATENT DOCUMENTS

| | | | |
|---|---|---|---|
| 1,042,456 | 10/1912 | Manson | 434/136 |
| 1,096,102 | 5/1914 | Gardner | 434/145 |
| 1,949,403 | 3/1934 | Ashlock | 434/142 |
| 2,099,518 | 11/1937 | Hazlett | 434/142 |
| 2,339,385 | 1/1944 | Dupler | 434/145 |
| 3,241,252 | 3/1966 | Baalson | 434/140 |
| 3,516,243 | 7/1969 | Hazard | 368/24 |
| 3,827,233 | 8/1974 | Villar Eschevarria et al. | 434/142 |
| 3,997,980 | 12/1976 | Rogers | 434/141 |

FOREIGN PATENT DOCUMENTS

| | | | |
|---|---|---|---|
| 1215598 | of 1966 | Fed. Rep. of Germany | 368/23 |
| 430683 | of 1911 | France | 368/23 |

OTHER PUBLICATIONS

"Mechanisms, Linkages and Mechanical Controls" ©, 1965, Nicholas Chironis, Ed., pp. 148–149.

Primary Examiner—Edward M. Coven
Assistant Examiner—V. Szczepanik
Attorney, Agent, or Firm—Edgar W. Averill, Jr.

[57] ABSTRACT

A device for controlling the direction of rotation of a world globe. The device has a ratchet ring which is affixed to the globe near the North or South Pole thereof. A deflectable pawl member is held by the support frame of the globe and permits the globe to rotate only so that its surface moves eastwardly.

13 Claims, 1 Drawing Sheet

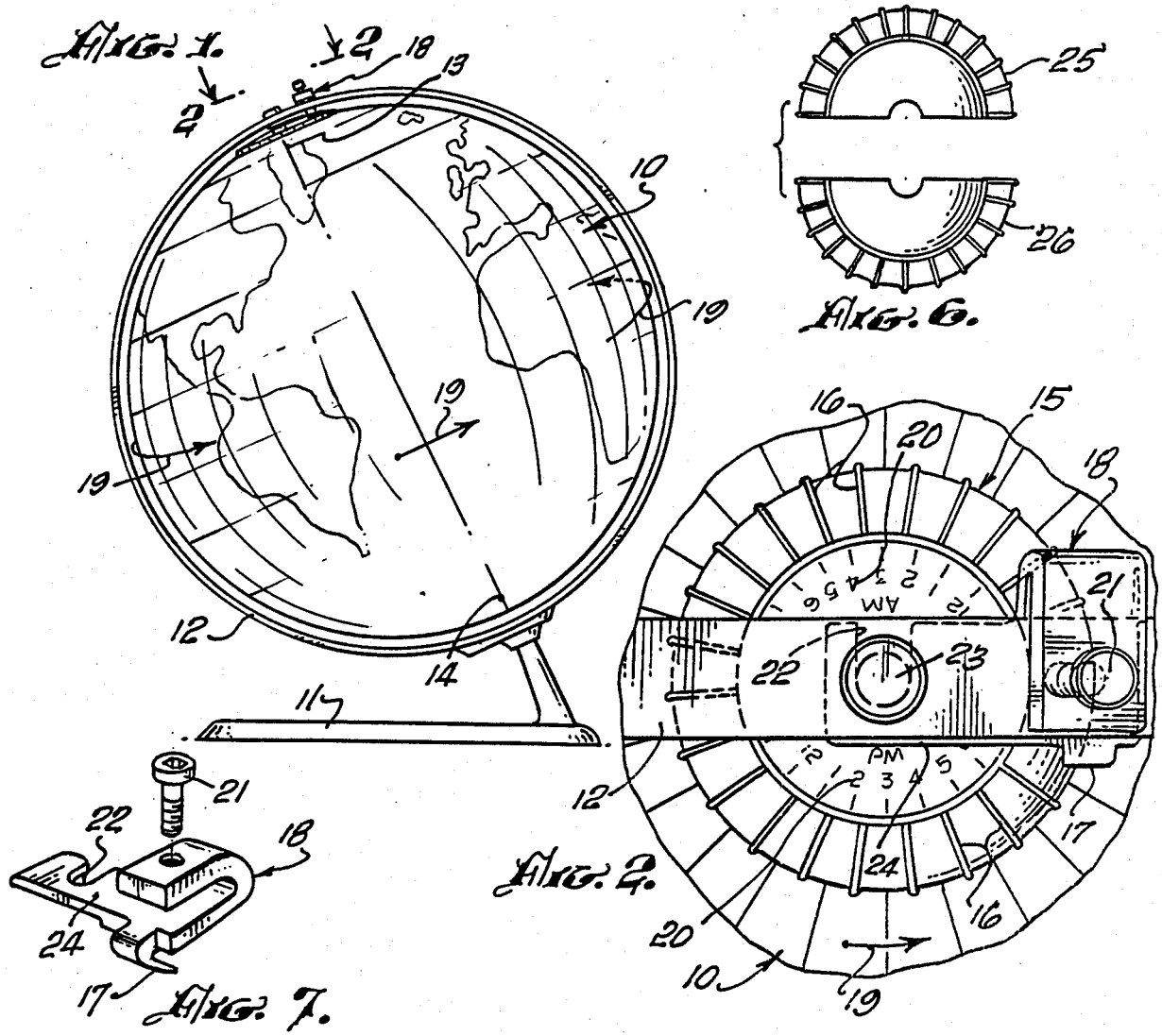
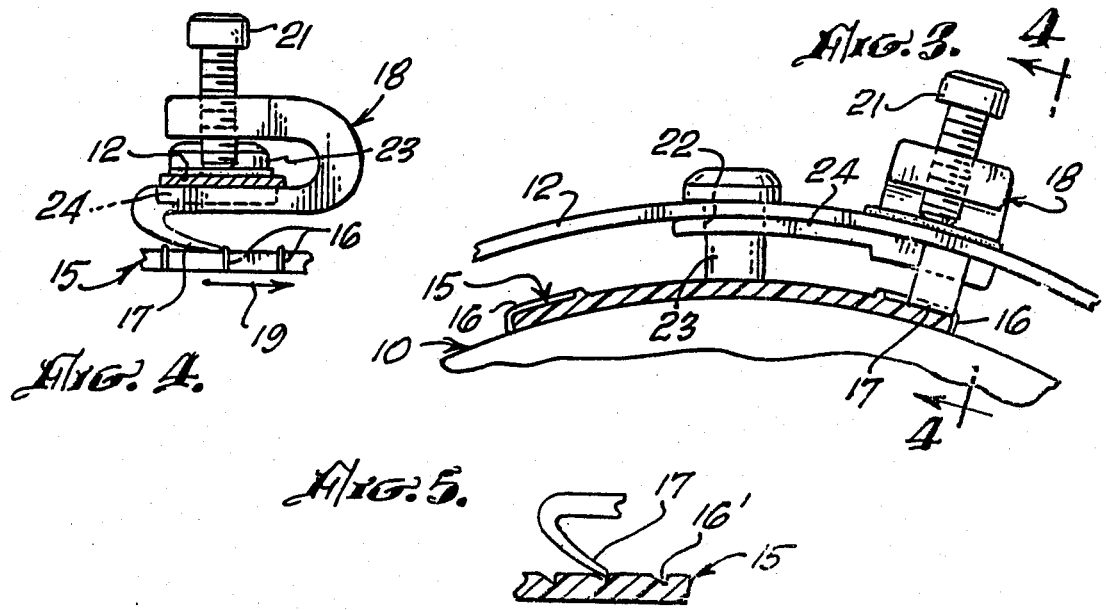

WORLD GLOBE ROTATION CONTROL DEVICE

BACKGROUND OF THE INVENTION

The field of the invention is educational devices and the invention relates more particularly to world globes.

World globes form a part of essentially all geography classes. Invariably, the globe is rotated randomly without an appreciation of the actual direction of rotation of the world. There is also, typically, no indication on the globe as to the amount of rotation which comprises the equivalent of an hour's time.

SUMMARY OF THE INVENTION

It is an object of the present invention to provide a device which restrains the incorrect direction of rotation of a world globe.

It is another object of the present invention to provide a device which gives an audible indication of the amount of rotation of the earth in one hour.

The present invention is for a device for controlling the direction of rotation of a world globe, said device comprises a ratchet ring with a plurality (such as 24) of raised or indented surface irregularities arranged radially from the center thereof. The ratchet ring is affixed either about the North Pole or the South Pole of the world globe. A deflectable pawl member is held by the support frame of the world globe, and the pawl member has a pawl finger which abuts the notches or bumps, and the pawl is oriented at an angle which points in an eastwardly direction so that it readily flexes when it passes over a notch or bump, but abuts the notch or bump when an attempt is made to rotate the globe in an incorrect direction. Preferably, there are twenty-four surface notches or bumps so that the pawl will make an audible click during a one/twentyfourth (one hour) rotation of the globe.

BRIEF DESCRIPTION OF THE DRAWINGS

FIG. 1 is a side view of a world globe including the rotational direction member of the present invention.

FIG. 2 is an enlarged top view taken along line 2—2 of FIG. 1.

FIG. 3 is an enlarged side view showing the ratchet and pawl of the globe of FIG. 1.

FIG. 4 is a view taken along line 4—4 of FIG. 3.

FIG. 5 is a cross-sectional side view of an alternate embodiment of the ratchet and pawl portion of the rotational direction member of the globe of FIG. 1.

FIG. 6 is a plan view of an alternate embodiment of the ratchet portion of the rotational direction member of FIG. 1.

FIG. 7 is a perspective view of the clamp and pawl assembly of the rotational direction member of the present invention.

DESCRIPTION OF THE PREFERRED EMBODIMENTS

A world globe containing the device for controlling the direction of rotation thereof is shown in side view in FIG. 1 and indicated by reference character 10. Globe 10 has a support stand 11 which supports a support band 12 in a conventional manner. Globe 10 is affixed conventionally at the North Pole 13 and the South Pole 14 to band 12 which in prior art globes permits the rotation of the world globe in either direction.

World globe 10 has a direction-limiting assembly mounted at the North Pole 13. The direction-limiting device comprises a ratchet ring 15 which is glued, or otherwise affixed, to the globe, and ring 15 has a plurality of indicator means 16. In the versions depicted in FIGS. 2, 3 and 4, the indicator means comprise ridges or bumps. In FIG. 5, the indicator means indicated by reference character 16' comprises notches. A flexible pawl finger 17 is shown best in FIG. 4 and is mounted on support band 12 by a removable clamp 18. Pawl finger 17 is angled in an eastwardly direction as indicated by arrow 19. An eastwardly direction arrow is also indicated by reference character 19 in FIG. 1. It can readily be seen that as the globe is rotated, pawl finger 17 is moved upwardly by the indicator means, such as ridges 16, and snaps downwardly after it passes over a ridge 16. This provides an audible click and, preferably, twenty-four notch means are provided, as shown in FIG. 2, so that the amount of rotation of the globe during one hour can easily be audibly indicated. It is also preferable that indicia 20 be provided, as shown in FIG. 2, to further teach the relationship between time and rotation of the earth.

The means used to hold pawl finger 17 is shown best in FIG. 4. Removable clamp 18 with its tightenable screw 21 provides an easily removed assembly which can be added whenever the subject is being discussed in a classroom for those applications where the globe is being used in a teaching environment. Furthermore, a concave indentation 22 is formed in arm 24 which is integral with removable clamp 18. This indentation surrounds pin 23 which holds the globe to band 12. This results in the accurate positioning of pawl finger 17 over the indicator means.

Preferably, pawl finger 17 is fabricated from a polymer such as ABS or nylon. It should be fabricated from a strong polymer since students will have a tendency to see what happens when it is rotated in the wrong direction. Although pawl finger 17 is shown in FIG. 7 as an integral member, it could be a separate member affixed to a clamp body.

As indicated above, an alternate embodiment of the ratchet ring 15 is shown in FIG. 5 in a fragmentary side view to illustrate clearly that the notch indicator can be either raised or depressed. Also, although the device is shown mounted at the North Pole 13, it could alternatively be mounted at the South Pole 14. Furthermore, it is within the purview of the present invention to mount a ratchet about the equator and the pawl on the support band also at the equator. The pole positions are preferred, however, as there is less geographical information to portray at the poles as compared to the equator. It is also possible that the ratchet could be formed about a shaft affixed to the North or South Pole (preferably the South Pole for this embodiment) and the pawl supported on the exterior thereof. The version depicted in the drawings, however, is preferred in that it may readily be added to existing globes, and the ratchet ring 15 is curved in different sizes for the more common size of globe such as 12" and 16" diameter globes. Ratchet ring 15 is preferably injection molded from plastic, although it could be cast from aluminum. Although the term "ratchet and pawl" has been used herein, other one-way rotation means can also be used. For instance, a clutch band surrounding a frictional surface is another means of permitting rotation only in one direction.

Although the ratchet ring 15 may be generally placed over an opening at the North or South Pole, for globe construction when this is not possible, a two-part ring 25 and 26 is shown in FIG. 6. This may be glued, or otherwise affixed, about pin 23 without disassembling the globe from band 12.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A device for controlling the direction of rotation of a world globe which is supported by a support frame, said device comprising:
   a ratchet comprising a ring with a plurality of indicator means arranged radially from the center thereof, said ratchet being affixed to a rotatable world globe about one of its centers of rotation thereof; and
   a deflectable pawl member held by the support frame of the world globe, said pawl member having a pawl finger abutting said indicator means of the ratchet at an angle to the upper surface of the ratchet, the angle of the pawl finger positioned so that the finger is pointing in an eastwardly direction so that the world globe may rotate so that its surface moves freely counter-clockwise as viewed from the North Pole but is restrained from rotating in a clockwise direction as viewed from the North Pole.

2. The device for controlling the direction of rotation of a world globe of claim 1 wherein said ratchet has twenty-four equally spaced indicator means so that the deflectable pawl member and the ratchet will make an audible click as the world globe is rotated an amount relative to the amount that the earth rotates in an hour.

3. The device for controlling the direction of rotation of a world globe of claim 1 wherein the ratchet member and the pawl finger are fabricated from a polymer.

4. The device for controlling the direction of rotation of a world globe of claim 1 wherein the ratchet is affixed about the North Pole of said world globe.

5. A device for controlling the direction of rotation of a world globe of the type including a support band supporting support pins between the band and the globe at the North and South Poles thereof, said device comprising:
   a one-way rotational member affixed between the globe and the support therefor, said one-way rotational member being affixed so that the surface of the world globe moves freely only in a counter-clockwise direction as viewed from the North Pole; wherein the one-way rotational device comprises a ring-shaped ratchet member affixed to the surface of the world globe, and a pawl member is affixed to the support frame of the world globe.

6. The device for controlling the direction of rotation of a world globe of claim 5 wherein a portion of the one-way rotational member is affixed about one of the poles of the world globe.

7. The device for controlling the direction of rotation of a world globe of claim 6 wherein a portion of the one-way rotational member is affixed at the North Pole.

8. The device for controlling the direction of rotation of a world globe of claim 5 wherein the ratchet member has twenty-four equally spaced indicator means.

9. The device for controlling the direction of rotation of a world globe of claim 8 wherein the indicator means are raised ridges.

10. The device for controlling the direction of rotation of a world globe of claim 5 wherein the ratchet member and the pawl are fabricated from a flexible polymer.

11. The device for controlling the direction of rotation of a world globe of claim 5 wherein the pawl member is removably affixed to the world globe support member.

12. The device for controlling the direction of rotation of a world globe of claim 5 wherein the pawl member includes a concave indentation which surrounds a support pin connecting the globe to a support band.

13. The device for controlling the direction of rotation of a world globe of claim 12 wherein the concave indentation is formed in an arm which is integral with the pawl member.

* * * * *